United States Patent
Räsänen

(10) Patent No.: US 6,556,550 B1
(45) Date of Patent: Apr. 29, 2003

(54) METHOD AND EQUIPMENT FOR TRANSMITTING TERMINAL INTERFACE USER DATA AND STATUS INFORMATION

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/284,647

(22) PCT Filed: Oct. 17, 1997

(86) PCT No.: PCT/FI97/00633
§ 371 (c)(1),
(2), (4) Date: Jun. 16, 1999

(87) PCT Pub. No.: WO98/18244
PCT Pub. Date: Apr. 30, 1998

(30) Foreign Application Priority Data

Oct. 18, 1996 (FI) .................................................. 964204

(51) Int. Cl.$^7$ ............................ H04J 3/16; H04L 29/02; H04L 29/12
(52) U.S. Cl. ..................... 370/329; 370/350; 370/470; 370/510; 455/450; 455/509
(58) Field of Search ................................ 370/328, 329, 370/336, 337, 345, 347, 350, 431, 463, 470, 474, 503, 509, 510, 522; 455/450, 451, 452, 453, 507, 509, 517

(56) References Cited

U.S. PATENT DOCUMENTS

| | | | |
|---|---|---|---|
| 5,099,517 A | 3/1992 | Gupta et al. | 380/29 |
| 5,197,068 A * | 3/1993 | Holien et al. | 370/110.4 |
| 5,459,469 A * | 10/1995 | Schuchman et al. | 342/37 |
| 5,798,726 A * | 8/1998 | Schuchman et al. | 342/37 |

FOREIGN PATENT DOCUMENTS

| | | |
|---|---|---|
| CH | 574 190 | 3/1976 |
| DE | 27 27 912 | 8/1978 |
| EP | 434 629 | 6/1991 |
| WO | 94/10802 | 5/1994 |
| WO | 97/18644 | 5/1997 |

OTHER PUBLICATIONS

"Flexible Assembler/Disassembler of an Aggregated Communication Link", IBM Technical Disclosure Bulletin, May 1992, vol. 34, Issue 12, pp. 405–410.*
"Very High Speed Communication Controller/PBX Concentrator", IBM Technical Disclosure Bulletin, Jan. 1, 1987, vol. 29, Issue 8, pp. 3577–3579.*

* cited by examiner

Primary Examiner—Alpus H. Hsu
(74) Attorney, Agent, or Firm—Pillsbury Winthrop LLP

(57) ABSTRACT

The invention relates to a mobile system in which the radio interface rate of a traffic channel and the intermediate rate of a transmission channel restrict the number of bits available for the transmission of terminal interface statuses (S), network independent clocking (N) and subchannel numbering (#) of a multichannel data link. In the invention, the bits form a subframe (n, . . . , n+10) and the status and control information are multiplexed inside successive subframes in a superframe structure (SUPERFRAME). In other words, the capacity of the bits available for the control information is shared by various kinds of control information by means of the superframe structure.

19 Claims, 5 Drawing Sheets

Fig. 3

Figure 1:
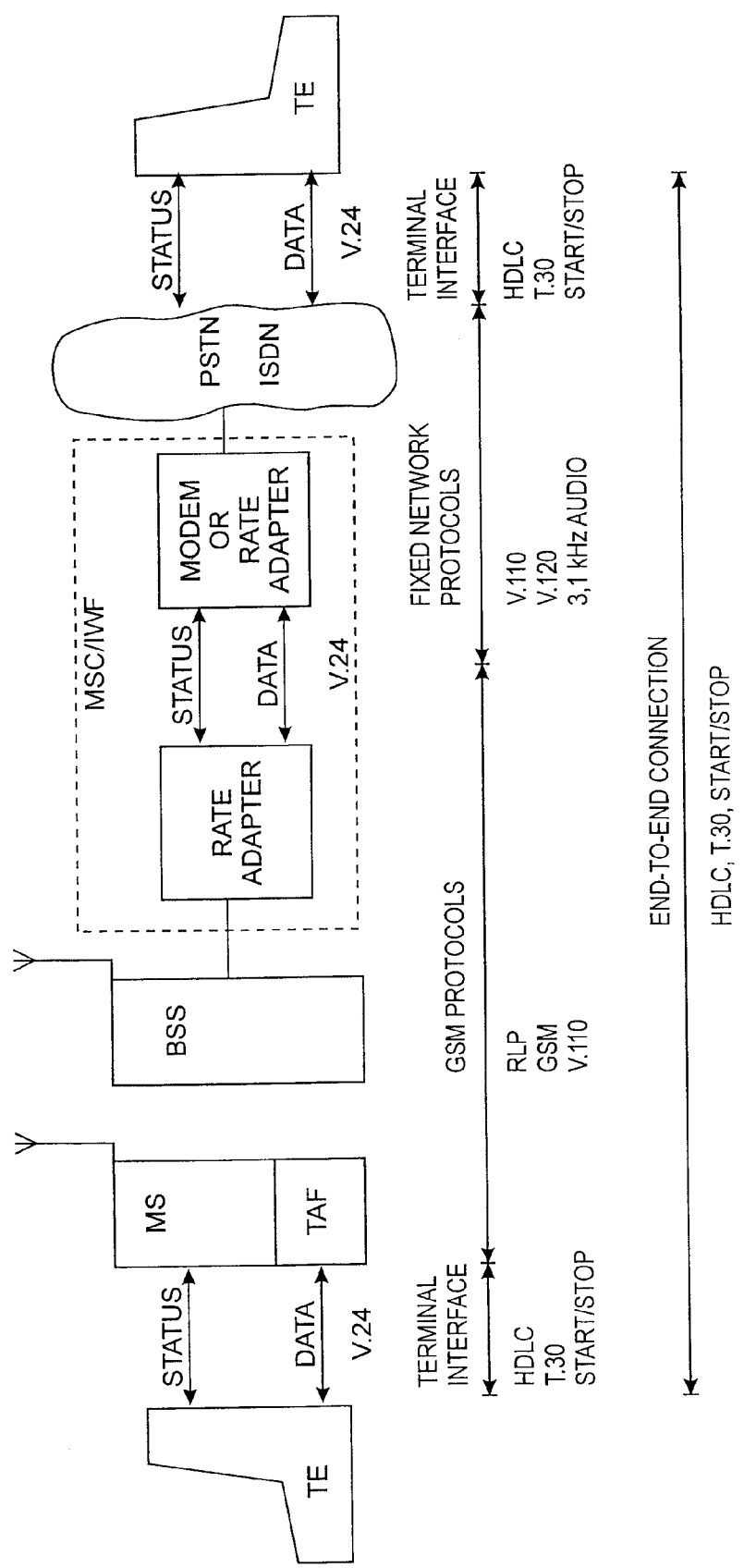

| Octet | Bit number | | | | | | | |
|---|---|---|---|---|---|---|---|---|
| no. | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | SP | SP |
| 3 | SP | D0 | D1 | D2 | D3 | D4 | D5 | D6 |
| 4 | 1 | | | | | | | |
| 5 | | | | | | | | |
| 6 | 1 | | | | | | | |
| 7 | | | | | | | | |
| 8 | 1 | | | | | | | |
| 9 | | | | | | | | |
| 10 | 1 | | | | | | | |
| 11 | | | | | | | | |
| 12 | 1 | | | | | | | |
| 13 | | | | | | | | |
| ... | ... | ... | ... | ... | ... | ... | ... | ... |
| | 1 | | | | | | | |
| 69 | | | | | | | | |
| 70 | 1 | | | | | | | |
| 71 | | | | | | | | |
| 72 | 1 | | | | | | | |
| 73 | | | | | | | | |
| 74 | 1 | | | | | | | |
| 75 | | | | | | | | |
| 76 | 1 | | | | | | | |
| 77 | | | | | | | | |
| 78 | 1 | | | | | | DS67 | DS68 |
| 79 | DS69 | DS70 | DS71 | DS72 | DS73 | DS74 | DS75 | DS76 |

HDLC PDU OF TERMINAL INTERFACE

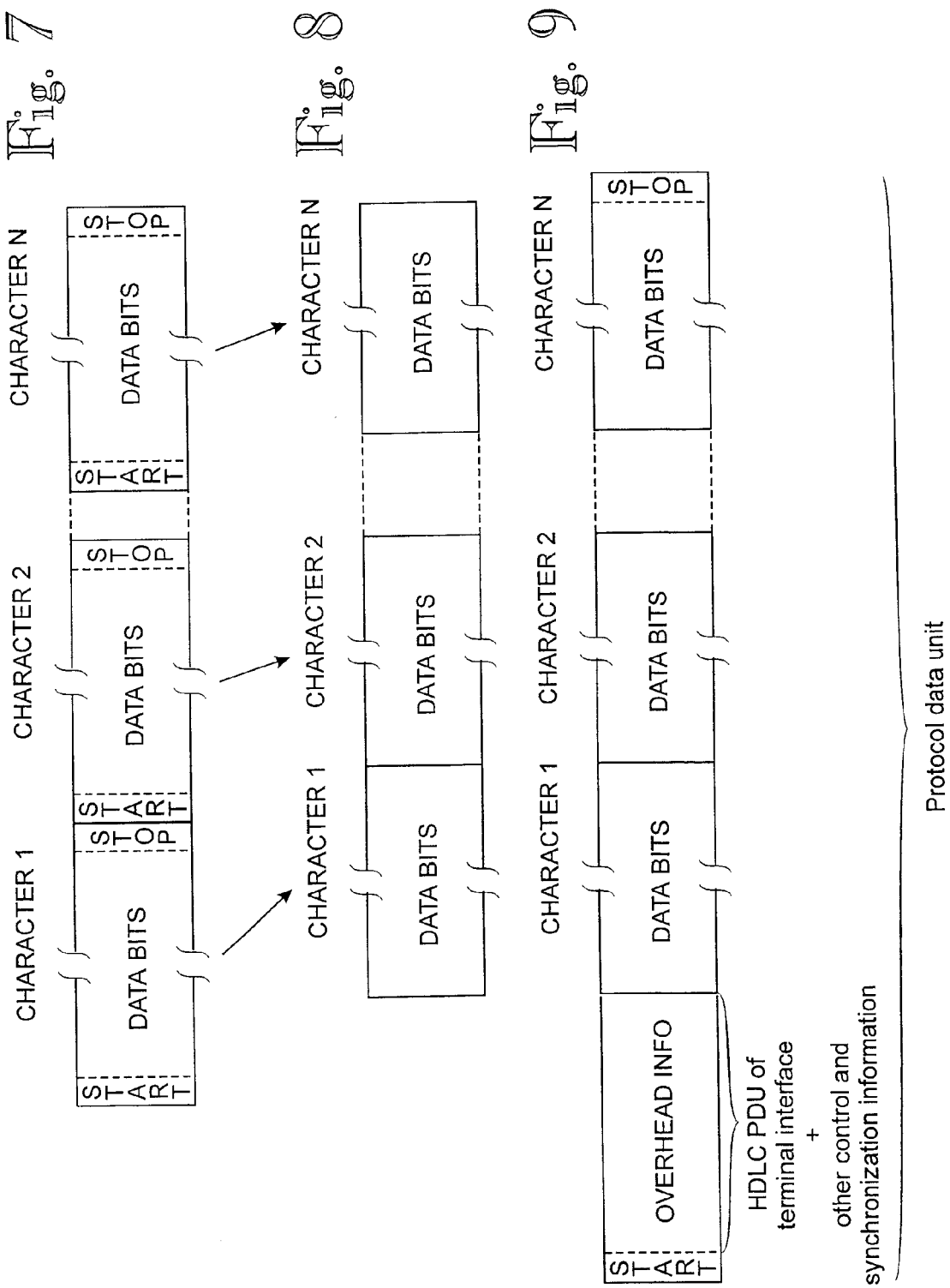

METHOD AND EQUIPMENT FOR TRANSMITTING TERMINAL INTERFACE USER DATA AND STATUS INFORMATION

This application is the national phase of international application PCT/FI97/00633 filed Oct. 17, 1997 which designated the U.S.

The invention relates generally to data transmission in a telecommunication system, and particularly to data transmission in which the maximum transmission capacity of a traffic channel is as high as or only slightly higher than one user data rate at a terminal interface.

Mobile systems generally mean different telecommunication systems that enable private wireless data transmission for subscribers moving within the system. A typical mobile system is a public land mobile network PLMN. The PLMN comprises fixed radio stations (base stations) located in the service area of a mobile network, the radio coverage areas (cells) of the base stations providing a uniform cellular network. A base station provides a radio interface (air interface) in the cell for communication between a mobile station and the PLMN.

Another field of mobile systems includes satellite-based mobile services. In a satellite system, radio coverage is obtained by satellites instead of terrestrial base stations, the satellites being in orbit round the earth and transmitting radio signals between mobile stations (or user terminals UT) and land earth stations (LES).

Subscriber mobility requires similar solutions in satellite mobile systems as in the PLMNs, i.e. subscriber data management, authentication and location management of mobile subscribers, handover, etc. The satellite systems should also support similar services as the PLMNs.

One way of meeting the above requirements in satellite mobile systems is to use existing PLMN solutions. In principle this alternative is very straightforward since a satellite system can basically be compared to a base station system of a mobile system having a different radio interface. In other words, it is possible to use conventional PLMN infrastructure where the base station system(s) is(are) a satellite system. In such a case, the same network infrastructure could, in principle, even contain both conventional PLMN base station systems and satellite 'base station systems'.

There are many practical problems, however, in adaptation of the PLMN infrastructure and a satellite system. A problem apparent to the Applicant is that a PLMN traffic channel and a traffic channel of a 'radio interface' in a satellite system differ considerably. Let us examine an example where the PLMN is the Pan-European digital mobile system GSM (Global System for Mobile Communication), and the satellite mobile system is the Inmarsat-P system that is currently being developed.

At present, a GSM traffic channel supports data transmission at user rates 2400, 4800, 7200 and 9600 bit/s. In addition to user data, status information on the terminal interface (control signals of a V.24 connection) is transmitted in both directions on the traffic channel. In transparent HSCSD data service, it is also necessary to transmit synchronization information between subchannels. In synchronous transparent bearer services, the clocking information of network independent clocking NIC must also be transmitted through a transmission channel from a transmitting terminal equipment to a receiving terminal equipment via a transmission network, when the transmission network and the transmitting terminal equipment are not in sync with each other, i.e. the terminal equipment uses network independent clocking (e.g. internal clock). The above-mentioned additional information raises the bit rate at the radio interface to be higher than the actual user rate. The GSM radio interface rates corresponding to user rates 2400, 4800 and 9600 bit/s are 3600, 6000 and 12000 bit/s. These signals are subjected to different channel coding operations, which raise the final bit rate to about 22 kbit/s.

The Inmarsat-P satellite system requires that the standard data rates up to 4800 bit/s (e.g. 1200, 2400, 4800 bit/s) can be transmitted on one traffic channel, and that the standard data rates exceeding 4800 bit/s (e.g. 9600, 14400, 19200 bit/s, etc.) can be transmitted by using several parallel traffic channels, like in the HSCSD service of the GSM system.

In the Inmarsat-P satellite system, the data rate of one traffic channel at the radio interface is at most 4800 bit/s, which equals the user data rate of 4800 bit/s at the terminal interface. In a data service employing two traffic channels, the data rate at the radio interface equals the user data rate of 9600 bit/s at the terminal interface. A problem arises when not only the user data but also the above-described terminal interface status information and any inter-subchannel synchronization information should be transmitted over the radio interface. The protocol data unit, i.e. frame structure, used by the satellite system at the radio interface should therefore be defined to carry the above-mentioned control and synchronization information over the radio interface.

One approach would be to use a GSM solution, i.e. a V.110-based frame structure, also at the radio interface of the satellite system. However, this would be a very complicated solution, and it would significantly reduce the user data rates available. A single traffic channel could not support the user data rate of 4800 bit/s since a V.110 frame structure and the terminal interface status information raise the actual data rate (radio interface rate) to be higher than 4800 bit/s. Therefore the highest standard user data rate on one traffic channel would be 2400 bit/s. For the same reason, a two-traffic-channel data service could not support the user rate of 9600 bit/s, but the highest standard user data rate would be 4800 bit/s (or in some systems 7200 bit/s). A corresponding decrease in the available data rates would also occur in data services employing more than two traffic channels. Such a solution, where the overhead information causes a significant loss of capacity, would not be satisfactory.

A similar problem can also arise when other types of radio interfaces, such as wireless telephone systems, are connected to the PLMNs.

A similar problem can also arise on other types of connections in which the radio interface rate is to be used as efficiently as possible. For example, a new 14400 bit/s traffic channel has been planned for the GSM. In order that the terminal interface statuses and any other control information could be transmitted over the radio path in addition to the 14400 bit/s user data, the radio interface rate, implemented on the present principles, must be higher than 14400 bit/s, about 18 kbit/s. A higher radio interface rate requires that the existing radio networks should be re-designed and the intermediate rate (TRAU) raised so that only two subchannels could be put in one 64 kbit/s timeslot in the HSCSD service (i.e. the efficiency decreases in a TRAU data link). A modification of the TRAU frame might make it possible to decrease the intermediate rate to 16 kbit/s, whereby the efficiency of the TRAU data link would not be impaired. The radio interface rate of 14400 kbit/s can be formed, for example, from the present radio interface rate of 12000 kbit/s by enhancing the puncturing that follows channel coding. The radio interface rate of 14400 kbit/s could not, however, transmit the necessary additional information with the user data rate of 14400 kbit/s, but the actual user data rate would be below 14400 kbit/s. The radio interface rate can be slightly raised (e.g. 100 to 300 bit/s) by enhancing the efficiency of the puncturing, and extra bits can be obtained thereby for the transmission of said control information. The enhancement of the puncturing, however, impairs the ability of the channel coding function to correct transmission errors.

In the above-described solutions, control information is transmitted in a frame structure (TRAU, radio burst) outside the user data stream.

Another approach, in which the control information is transmitted inside the user data stream, is disclosed in the Applicant's parallel patent applications FI 955,496, FI 955, 497 and FI 963,455. These applications describe data transmission methods in which the terminal interface status information and any other control or synchronization information are transmitted through a traffic channel in the redundant data elements of end-to-end protocols, such as the redundant parts of the protocol data units of user data or the start and stop bit positions of asynchronous data characters. The overhead information does thus not increase the number of the bits to be transmitted, so the transmission capacity of the traffic channel (e.g. radio interface rate of 14400 kbit/s) can be exactly the same as the user data rate at the terminal interface (e.g. 14400 kbit/s). No additional puncturing is thus needed at the radio interface for the transmission of the control information. In high-rate data transmission (HSDSD) a data link comprises a group of two or more traffic channels, whereby the total capacity of the group of traffic channels can be the same as the user data rate at the terminal interface.

Both the above approaches, however, pose an additional problem.

When the status and control information are transmitted in redundant bits inside the user data stream in the redundant data elements of the end-to-end protocols, then the transmission is dependent on the redundancy of the end-to-end protocols. Not all end-to-end protocols contain a sufficient number of redundant bits for carrying the terminal interface status bits, subchannel numbering bits and NIC code bits. This means that these protocols cannot be supported at all in transparent data transmission.

When the status and control information are transmitted on a traffic channel outside the user's end-to-end data stream, the transmission of user data is completely transparent, i.e. any end-to-end protocol whatsoever can be used. A problem, however, is that for example in the GSM a TRAU frame is not able to carry the terminal interface status bits, the subchannel numbering bits and the NIC code bits at the intermediate rate of 16 kbit/s. The intermediate rate of 16 kbit/s requires a frame structure that is so compact that there is no room for this additional information. On the other hand, a higher intermediate rate would restrict the number of subchannels in HSCSD transmission, as stated above.

The object of the invention is to eliminate the above problems.

The invention relates to a data transmission method according to claim 10, an equipment according to claim 8, and a mobile system according to claim 15.

The bits available for the transmission of the extra control information, such as the terminal interface status bits, the subchannel numbering bits and the NIC code bits, form a subframe, and two or more subframes form a superframe. In the invention, the information is then multiplexed inside successive subframes in the superframe structure. In other words, the capacity of the bits (subframe bits) available for the transmission of control information is shared in the time domain by various kinds of control information by means of the superframe structure. Preferably one, optionally several such bits in each subframe are used to form a superframe structure, i.e. to indicate at least where the superframe starts and optionally where it ends, and to produce the synchronization information. The remaining subbit or subbits are used to transmit the various kinds of status and control information in multiplexed form inside the superframe thus formed. The superframe bit itself can also be used to transmit the status and control information, if the superframe locking character is shorter than the number of bits reserved for it in the superframe.

The invention allows transmission of terminal interface status and control information and other control information, subchannel and/or frame numbering of a multichannel connection, and NIC codes, even if the number of available bits in one transmission frame or end-to-end user data protocol unit is smaller than the total bit number of the information to be transmitted. The only requirement is that in each frame or each end-to-end user data protocol unit the number M of bits available for this purpose is at least 2, if the superframe bit itself is not to be used or cannot be used for transmission of status or control information. If one and the same bit is used both for superframing and for the transmission of the status and control information, M can be 1. The size of the superframe, i.e. the number L of subframes within the superframe, depends on the total number N of bits to be transmitted and the number M of available transmission bits per subframe, being thus $L \geq M/N$. Generally, $N > M \geq 1$ and $L \geq 2$.

The invention is equally well suited for the transmission of control information both outside and inside the user data stream.

When data is transmitted in a frame structure (such as TRAU) outside the user data stream, the invention eases the pressure put on the intermediate rate and thereby allows a larger number of subchannels in multichannel data transmission (HSCSD). In addition, the number of additional bits needed at the radio interface (radio interface rate) can be reduced, which in turn decreases the need of additional puncturing.

The invention makes transmission inside the user data stream possible with all end-to-end protocols in which there are at least two bits available in the redundant data elements for the transmission of status and control information.

The term 'subframe' is here to be understood in a very general sense. In the invention, a subframe comprises the bits reserved for the transmission of the control information to be multiplexed inside an actual transmission frame or in the redundant data elements of end-to-end protocols, such as the redundant parts of the protocol data units of user data or the start and stop bits of asynchronous data characters. A 'superframe' in turn is a unit comprising two or more such successive frames.

Figure 2:
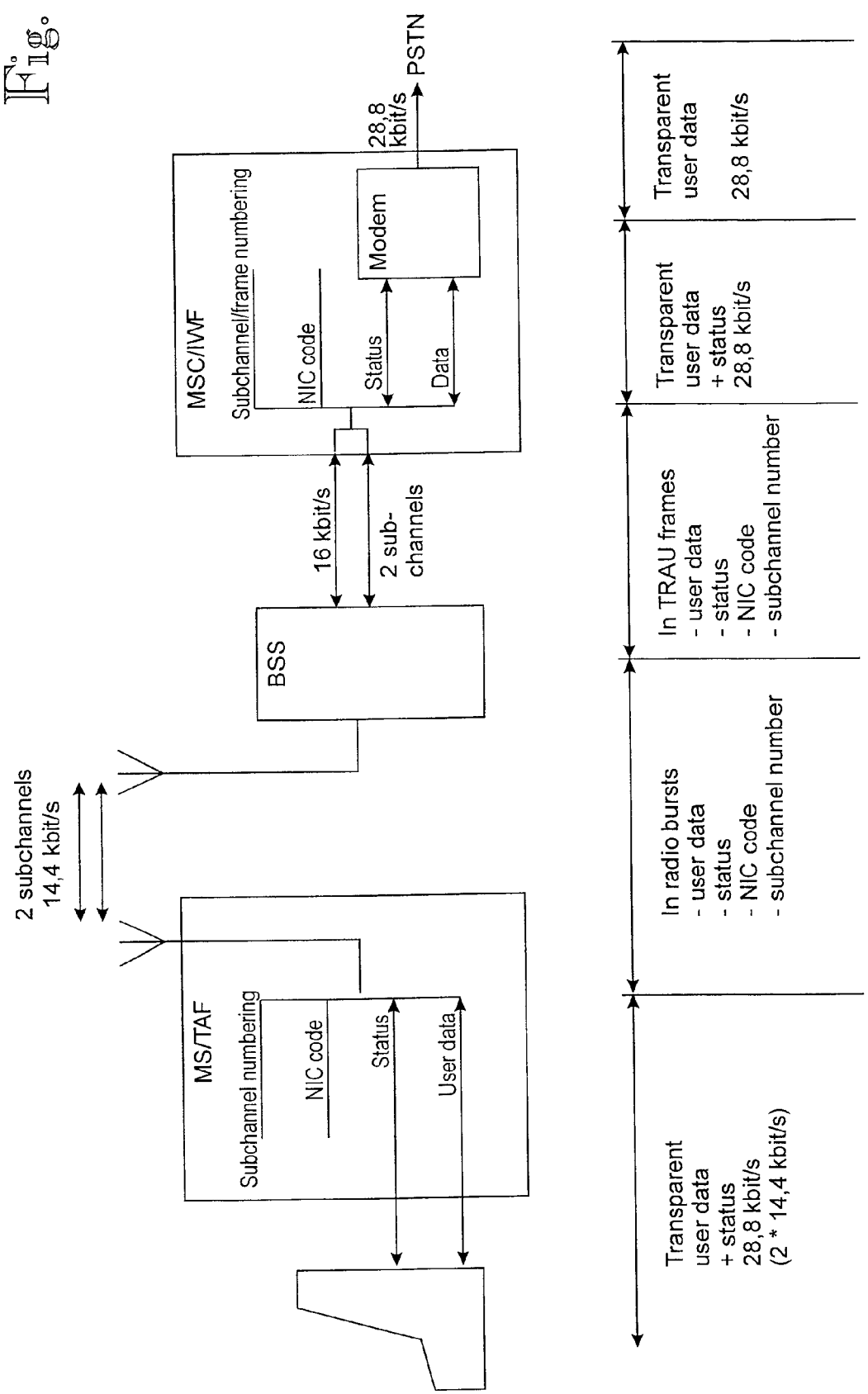
Figure 4:
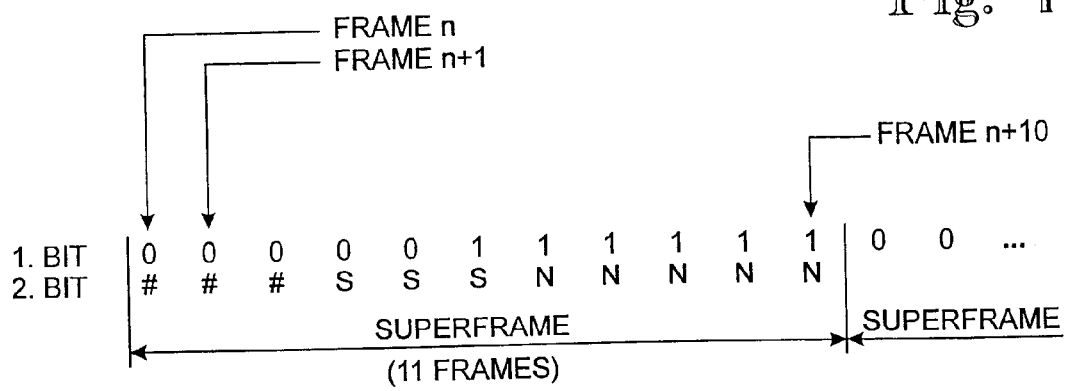
Figure 5:
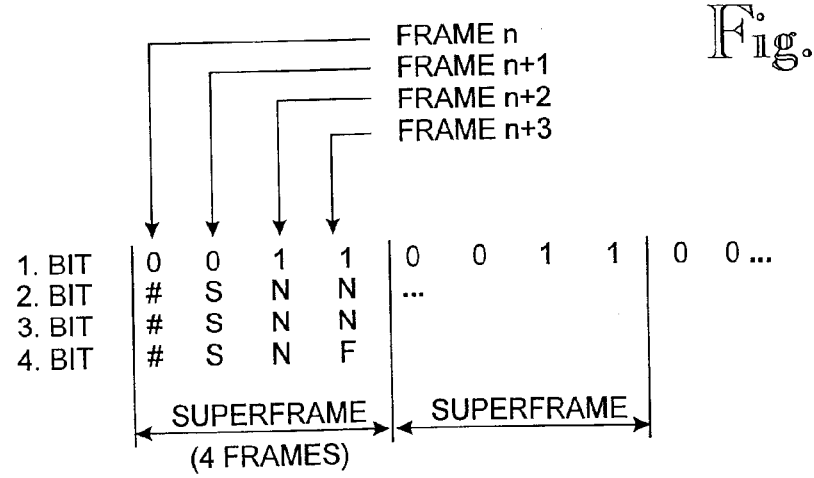
Figure 6:
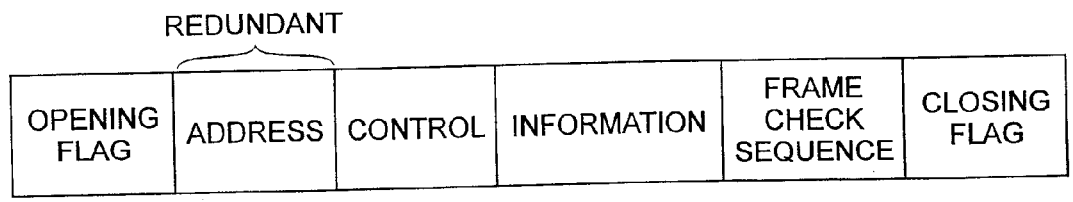

In the following the invention will be described by means of preferred embodiments with reference to the attached drawings, in which FIG. 1 is a block diagram illustrating a configuration for data transmission in accordance with the GSM recommendations, FIG. 2 is a block diagram illustrating the transmission of 28800 bit/s user data, terminal interface status and control information, NIC codes and subchannel/frame numbering via two GSM traffic channels, each of which has a radio interface rate that is higher than 14400 bit/s, FIG. 3 shows a TRAU frame for an intermediate rate of 16000 bit/s and a user rate of 14400 bit/s, FIGS. 4 and 5 show superframes according to the invention, FIG. 6 shows a HDLC frame, FIG. 7 shows a common asynchronous character sequence, and FIGS. 8 and 9 illustrate formation of a protocol data unit transmitting status information.

The present invention can be applied to data transmission through any traffic channel whatsoever, provided that the maximum data rate of the channel is equal to or slightly higher than the user data rate at the terminal interface. The traffic channel can be implemented by any multiple access technique, such as time division multiple access (TDMA) and code division multiple access (CDMA). The invention is obviously applicable in the new 14400 bit/s channel type of the GSM, the 9600 bit/s channel type of the CDMA, and the 4800 kbit/s channel type of the Inmarsat-P satellite system.

The preferred embodiments of the invention will be described below with reference to a 14400 kbit/s traffic channel of a GSM-based mobile system. The invention, however, is not to be understood as being limited to these systems.

The structure and the operation of the GSM mobile system, defined in the GSM specifications of the ETSI (European Telecommunications Standards Institute), are well known to those skilled in the art. Reference is also made to *GSM System for Mobile Communication* by M. Mouly and M. Pautet, Palaiseau, France, 1992; ISBN:2-9507190-0-7. The GSM-based mobile systems include the DCS1800 (Digital Communication System) and the U.S. digital cellular system PCS (Personal Communication System).

FIG. 1 illustrates a configuration for data transmission according to the GSM recommendations. FIG. 1 shows the basic structure of a GSM mobile system. The GSM structure comprises two parts: a base station system BSS and a network subsystem NSS. The BSS and mobile stations MS communicate via radio connections. In the base station system BSS, each cell is served by a base station BTS (not shown). A number of base stations are connected to a base station controller BSC (not shown), which controls the radio frequencies and channels used by the BTS. The BSSs are connected to a mobile services switching centre MSC. Certain MSCs are connected to other telecommunication networks, such as the public switched telephone network PSTN and the ISDN.

In the GSM system, a data link is established between a terminal adaptation function TAF of an MS and an interworking function IWF in the mobile network (usually in the MSC). In data transmission taking place in the GSM network, this connection is a V.110 rate-adapted, UDI-coded digital fullduplex connection that adapts to V.24 interfaces. The V.110 connection described herein is a digital transmission channel originally developed for ISDN (Integrated Services Digital Network) technology. It adapts to a V.24 interface, and also allows transmission of V.24 statuses (control signals). The CCITT recommendation for a V.110 rate-adapted connection is presented in the CCITT Blue Book: V.110. The CCITT recommendation for a V.24 interface is presented in the CCITT Blue Book: V.24. In non-transparent data services, a GSM connection also employs a radio link protocol RLP. The TAF adapts a data terminal TE connected to the MS to the above-mentioned GSM V.110 data link, which is established over a physical connection utilizing one or more traffic channels (HSCSD). The IWF comprises a rate adapter that adapts the GSM V.110 data link to a V.24 interface, and a data modem or another rate adapter, depending on whether the connection is extended to the PSTN or the ISDN. The ISDN protocols can be, for example, V.110 or V.120. In the ISDN or the PSTN, the data link is established, for example, to another data terminal TE. The V.24 interface between the MS and the TE is here called a terminal interface. A corresponding terminal interface is also found in the IWF, and for the other data terminal TE in the ISDN or the PSTN. The protocol used between the terminal equipments TE can be, for example, a HDLC protocol described in ITU-T recommendation X.25 or, in facsimile transmission, a protocol according to ITU-T T.30.

In the GSM, data is typically transmitted in TRAU data frames between the base station BTS and a specific transcoder unit TRCU (Transcoder/Rate Adaptor Unit) in the network. At present, the TRAU data frame is a 320-bit frame (20 ms), whereby the intermediate rate is 16000 bit/s at the present user data rates. The TRAU frame and its use are defined in GSM recommendation 08.60.

A GSM traffic channel supports data transmission at user rates 2400, 4800, 7200 and 9600 bites. In the future, high-speed data services (HSCSD=high speed circuit switched data) employing two or more traffic channels at a radio interface (multi-slot access) will also support higher user rates (14400 bit/s, 19600 bit/s, . . . .) In addition to user data, terminal interface status information (V.24 interface control signals), such as CT105 (RTS=request to send), CT108 (DTR=data terminal ready), CT106 (CTS=clear to send), CT107 (DSR=data set ready) and CT109 (CD=data carrier detect), is also transmitted in V.110 frames in both transmission directions. Further, in multichannel transparent HSCSD data service it is also necessary to transmit inter-subchannel synchronization information by which the order of data bits received from different subchannels can be restored. The above-mentioned additional information increases the bit rate at the radio interface to be higher than the actual user rate. The radio interface rates corresponding to user rates 2400, 4800 and 9600 bit/s are 3600, 6000 and 12000 bit/s.

The frame structure used for data transmission over a V.110 connection is described in greater detail e.g. in the GSM recommendations, and in Finnish Patent Applications No. 955,496 and 955,497.

It should be noted that the status bits of the V.110 frame are only an example of terminal interface status information and other information that would normally have to be transmitted in V.110 frames or other frames through a traffic channel. It is not essential to the invention, however, what the status information or any other control or synchronization information that is transmitted in addition to the user data actually contains. The invention is generally applicable to transmission of all such overhead information. More generally, the invention is applicable to transmission of all data that contains other information as well as user data.

A conventional GSM traffic channel thus has additional capacity for transmitting the necessary status and synchronization information, as well as the user data. With reference to a 14400 bit/s traffic channel, we shall now study cases in which there is no additional capacity (radio interface rate 14400 bit/s) or in which the capacity is to be maintained small (radio interface rate>14400 bit/s).

As stated above, the interface rate of 14400 bit/s can be formed from the interface rate of 12000 bit/s by increasing puncturing. The puncturing deletes some of the channel-coded bits before transmission in accordance with a predetermined rule.

In channel coding, for example a 72-bit information block can be supplied to a channel coder every 5 ms. Four such blocks are concatenated in the coding process, and four tail bits are added. The result is a 292-bit block, coded with a ½-rate convolution code. The coding yields 584 coded bits. The coding is punctured so that 128 bits (every $5^{th}$ bit) are not transmitted. The result is a block of 456 coded bits.

The capacity obtained from the channel coding can be used to raise the radio interface rate (data rate before and after channel coding) to 14400 bit/s or even above that. A drawback is that the efficiency of the channel coding is impaired, i.e. the bit error ratio increases and the coverage area of the cellular network is thereby decreased.

Radio Interface Rate Above 14400 Bit/s

When the radio interface rate is above 14400 bit/s, the status and control information of the terminal interface, the NIC codes and the subchannel/frame numbering of the HSDSD can be transmitted in radio bursts and TRAU frames outside the user data stream. FIG. 2 illustrates the transmission of 28800 bit/s user data, the terminal interface status and control information, the NIC codes and the subchannel/frame numbering via two GSM traffic channels, each of which has a radio interface rate that is higher than 14400 bit/s.

As stated above, it would here be advantageous that the intermediate rate, i.e. the TRAU frame transmission rate, would not exceed 16 kbit/s (between the BSS and the MSC/IWF). This requires a new kind of TRAU frame. FIG. 3 shows an optimized TRAU frame, which has been formed by deleting all unnecessary elements from a conventional data frame structure and by reducing the frame to 640 bits (length 40 ms instead of earlier 20 ms). The user data bits are placed in bit positions D1 to D576. The user data rate of 14400 bit/s can thus be transmitted at an intermediate rate of 16000 bit/s. In the new TRAU data frame, which is transmitted all the way between the base station BTS and the IWF (i.e. via or past the TRCU), control bits C6 to C9 (which in FIG. 3 are indicated by SP, SP, SP and D0) are not needed for the purpose currently allocated for them (some of the control bits are spare bits even in the present 320-bit TRAU frame). The bit positions can be used for the following:

transmission of terminal interface statuses transmission of channel/frame numbers of subchannels transmission of NIC codes (transparent synchronous call)

control of discontinuous transmission DTX from an MSC to a BTS separation of idle frames transmitted by the base station BTS from the frames of the synchronization step.

Since one bit is needed for the DTX control (bit position D0), the maximum of three bits C6 to C8 (SP) are available for the transmission of other control information. This, however, is not sufficient, since for example the NIC codes typically require 5 bits, the terminal interface status and control bits require 3 bits, and the HSCSD subchannel and/or frame numbering requires 2 or 3 bits.

In the invention the problem is solved by multiplexing the different kinds of control information inside the available bits in several successive TRAU frames. For this, the bits that are available for the transmission of control information in a TRAU frame are used as a subframe, the subframes of two or more successive TRAU frames forming a superframe, inside which said different kinds of control information are multiplexed.

In a preferred embodiment of the invention the four 'spare' bits in the TRAU frame are used as follows:

1 bit: superframing 1 bit: status and control information (terminal interface statuses, NIC, subchannel frame numbering)

1 bit: DTX 1 bit: spare the IWF can separate the idle frames of the BTS from the synchronization frames of the traffic channel for example on the basis of the superframe bit (an idle frame does not have a superframe structure, the bit is always '1'), or the spare bit of the TRAU frame can be used for this purpose.

FIG. 4 illustrates multiplexing according to the invention in the above-described situation where there are two bits available in a TRAU frame for the transmission of status and control information, i.e. the length of a subframe is two bits. From each subframe, one bit is used for the formation of a superframe and one for the transmission of control information. The total number of bits in the control information to be transmitted is 11 bits, i.e.: three subchannel/frame numbering bits #, three terminal interface status bits S, and five NIC code bits N. The superframe inside which the whole control information can be multiplexed comprises 11 subframes. In the example of FIG. 4 the subchannel/frame numbering bits # are transmitted in the first three subframes (n . . . n+2), the status bits S of the terminal interface in the next three subframes (n+3 . . . n+5), and the NIC codes N in the last five subframes (n+6 . . . n+10). The start of the superframe is indicated by setting '0' as the start bit in the first five subframes, and the end is indicated by setting '1' in the last six subframes.

FIG. 5 illustrates a second example, in which all four bits are assumed to be available in a TRAU frame, i.e. the length of a subframe is four bits. From each subframe is used one bit to form a superframe and three bits to transmit control information. The control information transmitted is the same as in FIG. 4, i.e. the total number of bits is 11 bits. The superframe inside which the desired control information can be multiplexed comprises 4 subframes, i.e. 12 bits. In the example of FIG. 5 the subchannel/frame numbering bits # are transmitted in the first subframe (n), the status bits S of the terminal interface in the second subframe (n+1), and the NIC code bits N in the third and fourth subframes (n+2 and n+3). In the extra bit position of the fourth subframe is placed a fill bit F. The beginning of a superframe is indicated by setting '0' as the start bit in the first two subframes, and the end is indicated by setting '1' as the start bit in the last two subframes.

The same principle can be applied to any number of status and control information bits and to any number of bits available in a transmission frame. Instead of the above-described bit patterns '11111000000' and '1100', the frame structure can use any bit pattern whatsoever, for example so that the effect of bit errors in superframe synchronization can be eliminated.

Also, additional puncturing and the subsequent decrease in the size of the coverage area of the cellular network are to be maintained as small as possible. As a result, the number of additional bits needed at the radio interface should be minimized.

On account of this, in a preferred embodiment of the invention the channel coding is punctured further (in addition to the puncturing required by the interface rate of 14400 bit/s) only by 1 bit/radio burst (duration of burst 5 ms), which means eight code bits/40 ms. When the coding ratio is X/Y=1/2 (number X of bits before channel coding/number Y of bits after channel coding), four bits per TRAU frame (40 ms) are available for the transmission of terminal interface statuses and other control information. In these bits it is possible to transmit said two bits of the TRAU frame on the connection MS-BTS. More particularly, the bits can be used, for example, as follows:

2 bits: detection of the halves of a double-length (40 ms) TRAU frame at the reception (MS and BTS). This is not necessary with the earlier 20 ms frame, since the beginning and the end are detected by means of radio path synchronization. It must be possible to separate the halves from each other, so that in a non-transparent case the beginning of a lengthened RLP frame can be detected, and in a transparent case the superframe structure, the data bits and the status and control bits can be detected.

1 bit: superframing (like in FIG. 4)

1 bit: status and control bits (like in FIG. 4).

Let us now study end-to-end data transmission in the direction MS/TAF-MSC/IWF, with reference to FIG. 2.

The MS receives 28800 bit/s user data DATA and terminal interface status and control bits STATUS from the terminal interface (data terminal equipment TE). In addition, the MS/TAF forms 5-bit code words of network independent clocking (NIC), as defined in GSM recommendation 04.21. Further, the MS/TAF generates the subchannel and/or frame numbering bits of the HSCSD. In the example, multichannel data transmission uses two subchannels for a user data rate of 28800 bit/s, the radio interface rate of the channels being higher than 14400 bit/s and the intermediate rate being 16000 bit/s. Let there be four bits available on the radio path and in the TRAU frames for the transmission of other than user data. The MS/TAF multiplexes the terminal interface status and control bits, the NIC code bits and the subchannel/frame number bits inside four bits, as shown in FIG. 4, and sends them to the BSS.

Multiplexing based on a 40 ms TRAU frame sequence can be performed on the radio path in different ways, and so the possibility of utilizing the spare bits of the TRAU frame varies. For example:

1) The same 40 ms sequencing is used. On the connection MS-BTS one bit per 20 ms is used to separate the halves of a 40 ms sequence from each other. Two bits remain for the superframing and multiplexing in accordance with FIG. 4.

2) 20 ms sequencing of the radio path is used. The available 4 bits per 40 ms are used so that two bits are used for superframing and two for the transmission of status and control information. This can be used, for example, as a safeguard against bit errors, for example so that each status bit is repeated or that both bits are used to transmit status and control information without that bits are repeated, whereby even the spare bit of the TRAU frame can be used to transmit status and control data.

3) 40 ms sequencing is used over the radio path. Only two bits instead of four are introduced into use by additional puncturing. The timing of the ¤40 ms is conducted in the BTS and the MS on the basis of the frame numbering of the radio path. Said two bits conduct the superframing and the multiplexing in accordance with the principle illustrated in FIG. 4.

If there are a sufficient number of bits available at the ratio interface, for example 11, multiplexing is not needed. The BSS generates TRAU frames, places user data bits in the frames and multiplexes the received control bits inside a superframe, as shown in FIG. 4. The MSC/IWF receives the TRAU frames, separates user data from the frames and demultiplexes the NIC code bits, the subchannel numbering bits and the terminal interface status and control bits from the superframe. The 28800 bit/s user data and the terminal interface status and control bits are supplied to the data modem of the IWF. The data modem communicates in the common manner on a 28800 bit/s modem connection with another data modem via the public switched telephone network PSTN, the latter modem being connected to a receiving terminal equipment TE.

In the opposite direction of transmission, the MSC/IWF multiplexes the NIC code bits, HSCSD subchannel/frame numbering bits and the terminal interface (data modem) status and control bits inside a TRAU frame, as shown in FIG. 4. The BSS separates the user data and said control information from the TRAU frames and sends them further over the radio interface to the MS/TAF. Like in the other direction of transmission, the control information can be in multiplexed or not multiplexed form when it is transmitted over the radio interface. Also in this direction of transmission it is possible to use either 20 ms or 40 ms sequencing over the radio path, as described above. The MS/TAF separates the user data and the terminal interface status and control bits and supplies them to the terminal equipment TE.

Radio Interface Rate 14400 Bit/s

If the data rate and radio interface rate of the traffic channel at the radio interface are the same as the user data rate at the terminal interface, for example 14400 or 4800 bit/s, there is no extra capacity on the traffic channel that could be used for transmitting other information in addition to the 14400 or 4800 bit/s data. The terminal interface status information and other control information are then transmitted through a traffic channel in the redundant data elements of end-to-end protocols, for example the redundant parts of the protocol data units of user data or in the start and stop bit positions of asynchronous data characters. For example, in the TRAU frame of FIG. 3 the terminal interface statuses and other control information are transmitted transparently within the data stream in data fields D1 to D576, and the control bit positions of the TRAU frame are not used for this purpose.

Finnish Patent Applications 955,496 and 955,497 by the same Applicant, incorporated herein by reference, teach a synchronous and, respectively, an asynchronous data transmission method in which the above-described principle can be utilized and the present invention applied.

In Finnish Patent Application 955,496, terminal interface status information and any other control or synchronization information are transmitted through a traffic channel in the redundant parts of the protocol data units of the current transmission protocol(s). At the receiving end the status information and any other information are separated from the protocol data units, and the original redundancy is restored to the protocol data units. The basis of this synchronous transmission is that the frame structures of many transmission protocols comprise redundant bits when they are used in the PLMN environment, e.g. in the GSM network, or as a result of repetition occurring in them, or for some other such reason.

For example, the bearer services of the PLMN networks use a point-to-point connection, i.e. a circuit-switched connection is used between two points. Most transmission protocols are also meant for point-to-multipoint connections, in which case their frame structure comprises an address field. The address field is redundant on a point-to-point connection. The terminal interface status information and any other control or synchronization information are transmitted in such an address field. The protocols include, for example, HDLC-based (high level data link) protocols.

A synchronous facsimile protocol according to GSM recommendation 03.45 uses a HDLC frame according to FIG. 6 comprising a redundant ADDRESS field at a binarycoded signalling stage and at an error-corrected facsimile data transmission stage. It also comprises other stages in which GSM specific frames are sent. These frames contain redundancy in the form of repetition of the same information.

If the facsimile service uses a normal facsimile data mode NFD according to ITU-T T.30, the data contains end-of-line chains (EOL), facsimile-coded data, and optionally stuffing data to make up the minimum line length. The stuffing can be considered redundant in respect of the transmission. Other protocols are described in greater detail in Finnish Patent Application 955,496.

The number of redundant bits available for the transmission of extra control information may be insufficient, in the same way as in the case of 16 kbit/s TRAU frames. For example, the address of a HDLC frame provides at most 8 bits (in practice 6 bits), whereas the NIC code bits, the HSCSD subchannel/frame numbering and the terminal interface status bits can require 11 bits. The control information multiplexing according to the present invention can then be applied to the redundant bits of for example two successive HDLC frames.

In Finnish Patent Application 955,497, transmission of terminal interface status information and any other control or synchronization information is based on synchronous/asynchronous conversion, which is needed at the transmitting end; when asynchronous characters are transmitted through a synchronous traffic channel, asynchronous/synchronous conversion is needed at the transmitting end. The conversion defines rate adaptation, underrate processing, and overrate processing. Underrate processing means that extra stop bits STOP are added between the asynchronous characters before transmission. Overrate processing means that STOP bits are removed now and then from between the asynchronous characters before transmission. This kind of conversion is defined e.g. in ITU-T recommendation V.14, which also sets the limits on the underrate and overrate.

The conversion can be used for transmitting the overhead information of the terminal interface by concatenating asynchronous characters to form longer 'protocol units' and by removing the START bits and STOP bits from between the concatenated characters, as shown in FIGS. 7, 8 and 9. The capacity made available by the removal of the start and stop bits is used for the transmission of status information. Standard underrate and overrate processing and rate adaptation are applied to this new protocol data unit PDU. The protocol data units are transmitted over a synchronous traffic channel to a receiver. The receiver synchronizes with the START bits and performs operations that are reverse to those performed by the transmitter. In other words, the receiver separates from the protocol data unit asynchronous data characters, terminal interface status information, and any other control or synchronization information.

Even in this case the number of available bits may be insufficient, whereby the control information can be multiplexed inside the available bits of two or more successive protocol data units in accordance with the same principles that were described above in connection with the TRAU frames.

Both in synchronous and in asynchronous transmission, the multiplexing and demultiplexing according to the invention are conducted in the MS/TAF and the MSC/IWF. In the demultiplexing, the redundancy of the user data protocol is restored. The control information passes between the MS/TAF and the MSC/IWF inside the user data stream, and it is not processed separately.

The figures and the accompanying description are only intended to illustrate the present invention. The invention can vary in its details within the scope and spirit of the attached claims.

What is claimed is:

1. A method of transmitting terminal interface user data and status information and any other control or synchronization information in protocol data units through a traffic channel or a group of traffic channels in a telecommunication system, comprising allocating for said status and control information a number of bits inside or outside the user data bit stream from protocol data units, the number of the allocated bits being smaller than the total number of bits in the status and control information, using at least one of said allocated bits to indicate a start of a superframe that includes said allocated bits from at least two protocol data units from, and multiplexing said status and control information inside said allocated bits within said subframe.

2. A method according to claim 1, comprising allocating said bits from redundant data elements of end-to-end protocols of the terminal interface, when said status and control information are transmitted inside the user data bit stream.

3. A method according to claim 1, comprising subjecting a channel-coded signal to additional puncturing so as to raise a radio interface rate of the traffic channel to be higher than the highest user data rate of the traffic channel, and allocating said bits from a radio burst from among the additional bits that are produced by said additional puncturing.

4. A method according to claim 1 or 3, comprising allocating said bits from a transmission frame in which the user data is transmitted over the transmission links of a mobile communication network.

5. A method according to claim 4, comprising the transmission frame being a 640-bit Transcoder/Rate Adaptor Unit data frame that is arranged to produce an intermediate rate of 16000 bit/s at a user data rate of 14400 bit/s, and by allocating said bits from among the seventh and eighth bits of the second octet and the first and second bits of the third octet of said 640-bit Transcoder/Rate Adaptor Unit data frame.

6. A method of transmitting terminal interface user data and status information and any other control or synchronization information in protocol data units through a traffic channel or a group of traffic channels in a telecommunication system, comprising allocating for said status and control information a number of bits from a transmission frame in which the user data is transmitted over the transmission links of a mobile communication network, the number of the allocated bits being smaller than the total number of bits in the status and control information, using at least one of said allocated bits to indicate a start of a superframe that includes said allocated bits from at least L transmission frames, where L is an integer and L≧2, multiplexing N-bit status and control information into said allocated bits inside said superframe that comprises L M-bit subframes, where M and N are integers and N>M≧2, transmitting said superframe in M allocated bits in L successive transmission frames over a transmission link of the mobile network, and transmitting said superframe in M allocated bits in L successive radio bursts over the radio path.

7. A method of transmitting terminal interface user data and status information and any other control or synchronization information in protocol data units through a traffic channel or a group of traffic channels in a mobile system including a high-rate data transmission service based on parallel use of two or more traffic channels as subchannels in one and the same data call, comprising allocating for said status and control information a number of bits inside or outside the user data bit stream from protocol data units, the number of the allocated bits being smaller than the total number of bits in the status and control information, using at least one of said allocated bits to indicate a start of a superframe that includes said allocated bits from at least two protocol data units, and multiplexing said status and control information inside said allocated bits within said super-frame, said status and control information comprising terminal interface status information, the subchannel and/or frame numbering of the high-rate data transmission service, and the code words of network independent clocking.

8. Transmission and reception equipment for transmitting the terminal interface user data and status information and any other control information in protocol data units through a traffic channel in a telecommunication system, comprising a transmission equipment being configured to multiplex N-bit status and control information inside a superframe that comprises L M-bit subframes, where M, N and L are integers and N>M≧1 and L>2, and the transmission equipment being configured to transmit said superframe in M bits allocated from inside or outside the user data bit stream in L successive protocol data units over a traffic channel.

9. Equipment according to claim 8, the telecommunication system being a mobile communication system in which a channel-coded signal is subjected to additional puncturing so as to raise a radio interface rate of the traffic channel to be higher than the highest user data rate of the traffic channel, and the transmission equipment being configured to transmit said superframe in M allocated bits in L successive radio bursts over the radio path.

10. Equipment according to claim 8 or 9, wherein the user data is transmitted over a transmission link of a mobile network in transmission frames, and wherein the transmission equipment is arranged to transmit said superframe in M allocated bits in L successive transmission frames over the transmission link.

11. Equipment according to claim 10, comprising the transmission frame being a 640-bit Transcoder/Rate Adaptor Unit data frame that is arranged to produce an intermediate rate of 16000 bit/s at a user data rate of 14400 bit/s.

12. Equipment according to claim 8, comprising the transmission equipment being arranged to transmit said superframe in M redundant data elements of the end-to-end protocols of the terminal interface, when said status and control information are transmitted inside the user data bit stream.

13. Equipment according to claim 8, comprising the equipment being a terminal adaptation function of a mobile station, an interworking function of a mobile network, a base station or a land earth station of a satellite system.

14. Transmission and reception equipment for transmitting the terminal interface user data and status information and any other control information in protocol data units through a traffic channel in a mobile system including a high-rate data transmission service that is based on parallel use of two or more traffic channels as subchannels in one and the same data call, comprising the transmission equipment being configured to multiplex N-bit status and control information inside a superframe that comprises L M-bit subframes, where M, N and L are integers and N>M≧1 and L>2, and the transmission equipment being configured to transmit said superframe in M bits allocated from inside or outside the user data bit stream in L successive protocol data units over a traffic channel, said status and control information comprising terminal interface status information, the subchannel and/or frame numbering of the high-rate data transmission service and the code words of network independent clocking.

15. A mobile communication system comprising transmission and reception equipment for transmitting the terminal interface user data and status information and any other control information in protocol data units through a traffic channel, comprising means for multiplexing N-bit status and control information inside a superframe that comprises L M-bit subframes, where M, N and L are integers and N>M≧1 and L≦2, means for transmitting the superframe in M bits allocated from inside or outside the user data bit stream in L successive protocol data units over the traffic channel.

16. A mobile communication system according to claim 15, comprising subjecting a channel-coded signal to additional puncturing so as to raise the radio interface rate of the traffic channel to be higher than the highest user data rate of the traffic channel, and the mobile station and the base station being arranged to transmit said superframe in M allocated bits in L successive radio bursts over the radio path.

17. A mobile communication system according to claim 15, comprising the mobile station and the interworking function of the mobile network being arranged to transmit said superframe in M redundant data elements of end-to-end protocols of the terminal interface inside the user data bit stream.

18. A mobile communication system comprising transmission and reception equipment for transmitting the terminal interface user data and status information and any other control information in protocol data units through a traffic channel, comprising a multiplexer multiplexing N-bit status and control information inside a superframe that comprises L M-bit subframes, where M, N and L are integers and N>M≧1 and L≦2, a transmitter transmitting, the superframe in M bits allocated from inside or outside the user data bit stream in L successive protocol data units over the traffic channel the base station and the interworking function of the mobile network being configured to transmit said superframe in M allocated bits in L successive transmission frames over a transmission link between the interworking function and the base station.

19. A mobile communication system according to claim 18, comprising the traffic channel being a 14400 bit/s traffic channel and the transmission frame being a 640-bit Transcoder/Rate Adaptor Unit data frame with a length of 40 ms, which corresponds to an intermediate rate of 16000 bit/s, and by the Transcoder/Rate Adaptor Unit data frame comprising 576 data bits for 14400 bit/s user data and at most four bits for the terminal interface statuses, network independent clocking and subchannel or frame numbering of a multichannel data link.

* * * * *